United States Patent [19]
Andrews

[11] Patent Number: 5,200,228
[45] Date of Patent: Apr. 6, 1993

[54] SHAPED SUGAR CANE PRODUCT

[76] Inventor: Kevin B. Andrews, 41-745 Mooiki St., Waimanalo, Hi. 96795

[21] Appl. No.: 787,637

[22] Filed: Nov. 4, 1991

[51] Int. Cl.⁵ .............................................. A23L 1/212
[52] U.S. Cl. ...................................... 426/615; 127/29; 426/640; 426/658
[58] Field of Search ............... 426/615, 640, 658, 518; 127/29, 34, 42, 43; 83/345, 355, 39

[56] References Cited

U.S. PATENT DOCUMENTS

| | | | |
|---|---|---|---|
| 3,566,944 | 3/1971 | Tilby | 426/518 X |
| 3,871,256 | 3/1975 | Willett | 83/355 |
| 3,995,520 | 12/1976 | Sprago | 83/345 |
| 4,065,912 | 1/1978 | Quick | 83/345 X |
| 4,572,741 | 2/1986 | Mason | 127/42 |
| 5,058,478 | 10/1991 | Mendenhall | 83/857 |

*Primary Examiner*—Arthur L. Corbin
*Attorney, Agent, or Firm*—Frank J. Dykas; Craig M. Korfanta; Ken J. Pedersen

[57] ABSTRACT

A shaped sugar cane product for use as chopsticks, garnish sticks, stir sticks and snack sticks made from sugar cane stalks. The method comprises billeting the stalks into desired lengths for the sticks, and then pressing the billets lengthwise against a cutter comprising a grid of intersecting cutting blades to produce finished sticks.

4 Claims, 4 Drawing Sheets

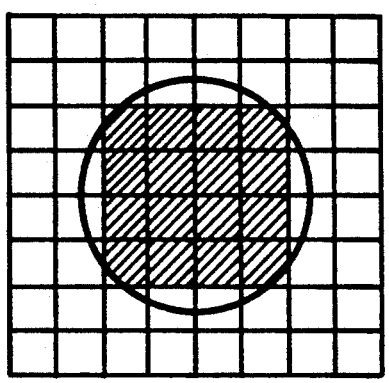
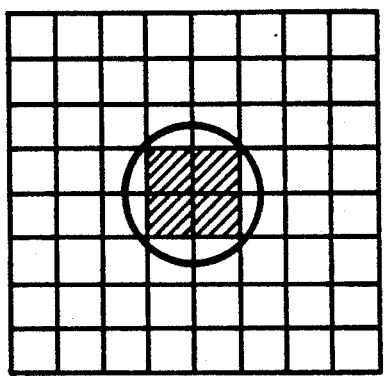
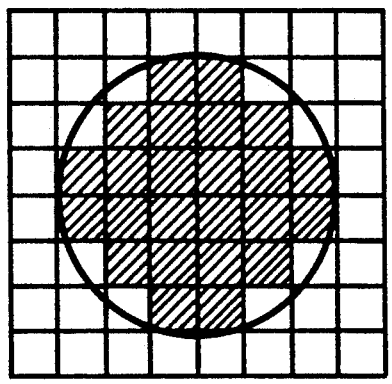
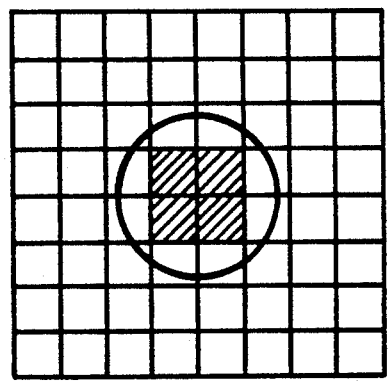
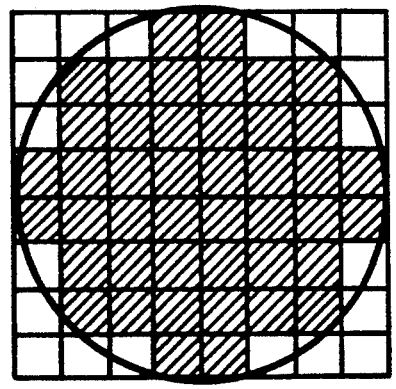
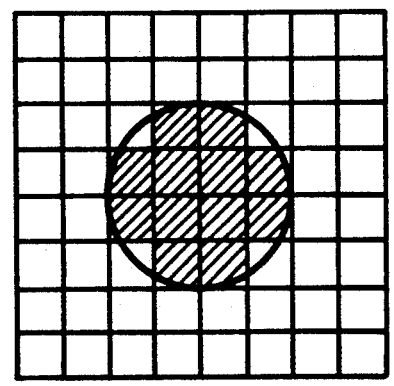
FIG.4

SHAPED SUGAR CANE PRODUCT

BACKGROUND OF THE INVENTION

1. Technical Field

This invention relates to sugar cane, and to shaped products made from sugar cane. In particular, this invention relates to chopsticks and garnish sticks for food, stir sticks for beverages and snack sticks which are made from sugar cane, and to the method of making them.

2. Background Art

Shaped sugar cane products have been previously made by sawing the sugar cane stalks into the desired size and shape. However, this technique is relatively slow and expensive, and results in a loss of some of the stalk to sawdust.

Chopsticks, garnish sticks and stir sticks have been previously made from wood and plastic and other slowly bio-degradable materials. However, with environmental concerns in mind, a natural, quickly biodegradable material for these items is highly desirable.

There is a need, then, for shaped sugar cane products which may be manufactured quickly and inexpensively, and which quickly bio-degrade after use to lessen the strain on our environment.

SUMMARY OF INVENTION

What I have invented is:

A shaped sugar cane product made by the method of:
  a. billeting sugar cane stalks into lengths of from about 1½ inches to about 20 inches, and
  b. cutting the billets into sticks by pressing the billets lengthwise against a cutter comprising a grid of intersecting cutting blades.

Also, my invention is:

A method for making a shaped sugar cane product which comprises:
  a. billeting sugar cane stalks into lengths of from about 1½ inches to about 20 inches, and
  b. cutting the billets into sticks by pressing the billets lengthwise against a cutter comprising a grid of intersecting cutting blades.

From the practice of my invention, biodegradable, shaped sugar cane products may be manufactured quickly and inexpensively.

BRIEF DESCRIPTION OF THE DRAWINGS

FIG. 4 shows schematic end views of sugar cane stalks of varying diameter exiting the cutter used in my system.

BEST MODE FOR CARRYING OUT INVENTION

Figure 1:
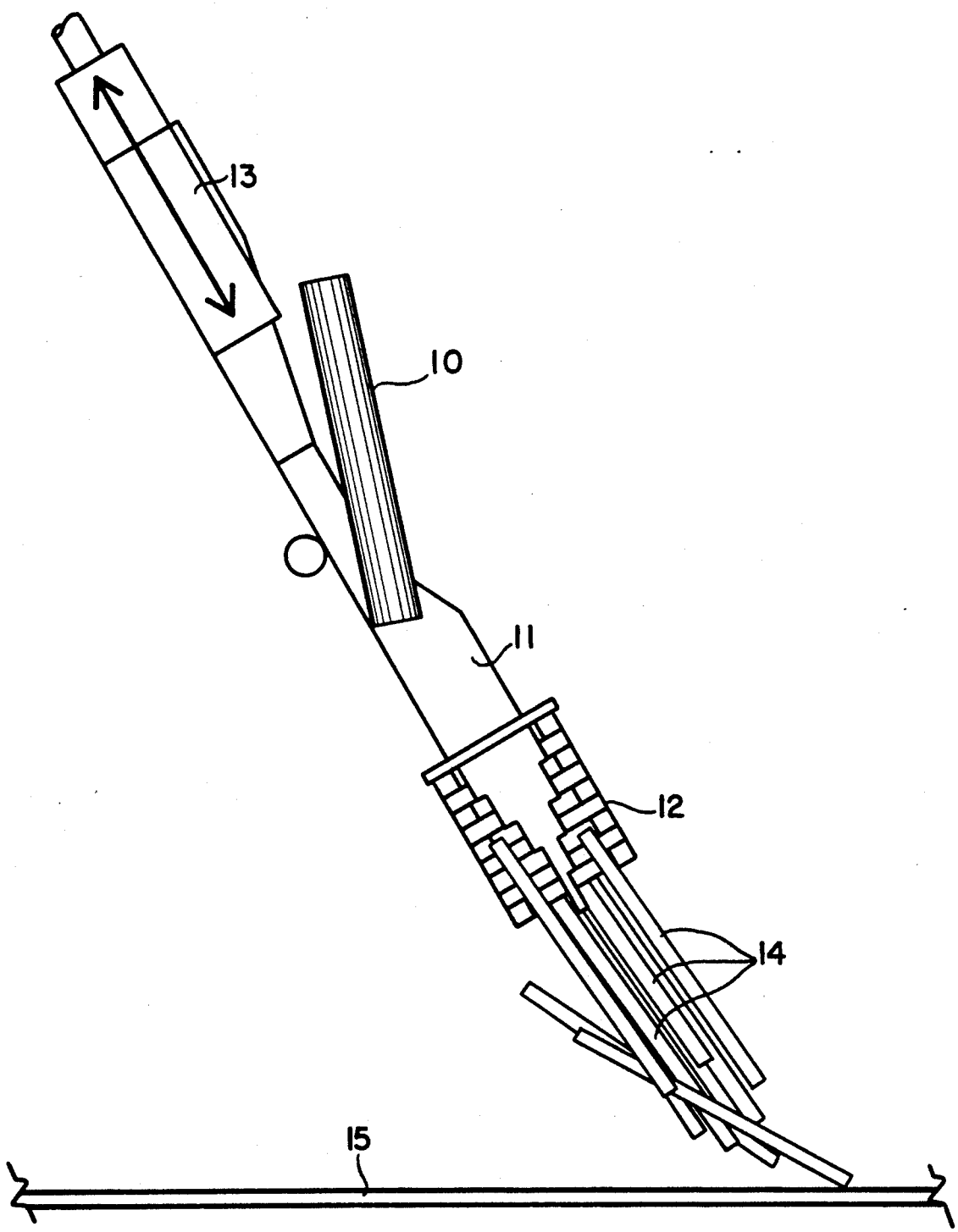
FIG. 1 is a schematic view of my cutting system.

Referring to the Figures, there is depicted as individual sugar cane stalk billet 10 entering receiver chamber 11 which holds stationary cutter 12. Ram-press 13 is activated to push individual billet 10 into receiver chamber 11 and to press the billet through cutter 12. Cut sticks 14 exit cutter 12 and fall onto discharge conveyor 15 for transport to cleaning and packaging steps.

Billet 10 has been previously cut to the desired length from a longer cane stalk by sawing or shearing. Billet 10 may be from about 1½ inches to about 20 inches in length, depending on the intended use for the cut sticks. Ten inches is a good length for chopsticks and tall drink stirrers, for example. Four inches is a good length for coffee and tea stirrers.

Receiver chamber 11 is a firm straight tube with an opening on its one side and end for accepting the billet 10. Near the receiver's other end, in alignment with the central passageway of the tube, it holds stationary cutter 12.

Figure 3:
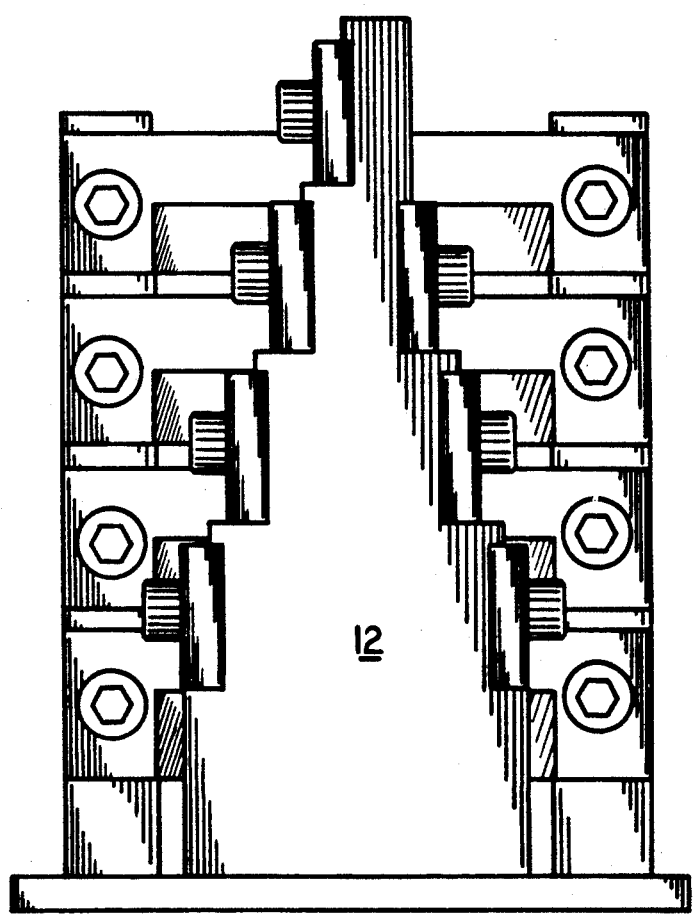
FIG. 3 is a top, cross-sectional view of a cutter used in my system.

Cutter 12 comprises a grid of intersecting cutting blades. It is fastened to receiver 11 so that its central passageway aligns with the central passageway of the tube. The grid of blades may be fastened in the cutter in any suitable fashion, however, a preferred cutting blade is disclosed in Mendenhall, U.S. Pat. No. 5,058,478. This type of blade provides a quick, clean cut with very little loss to sawdust or debris. A top, cross-sectional view of this type of cutter 12 is depicted in FIG. 3.

The blades of cutter 12 are arranged in intersecting planes. It is not necessary that the blades themselves intersect, however. For example, vertical blades may be offset from horizontal blades. Also, the angle of intersection of the planes of the blades need not be 90°. In fact, the planes of the blades may be arranged to provide cut sticks of triangular or diamond shapes, for example. The distance between blade planes, and the thickness of the cut sticks may vary from about 1/16 inch to about ½ inch, depending on the intended use of the sticks. A collection of end views of different sized stalks exiting the cutter with 1/4 inch rectangular spacings are depicted in FIG. 4.

Figure 2:
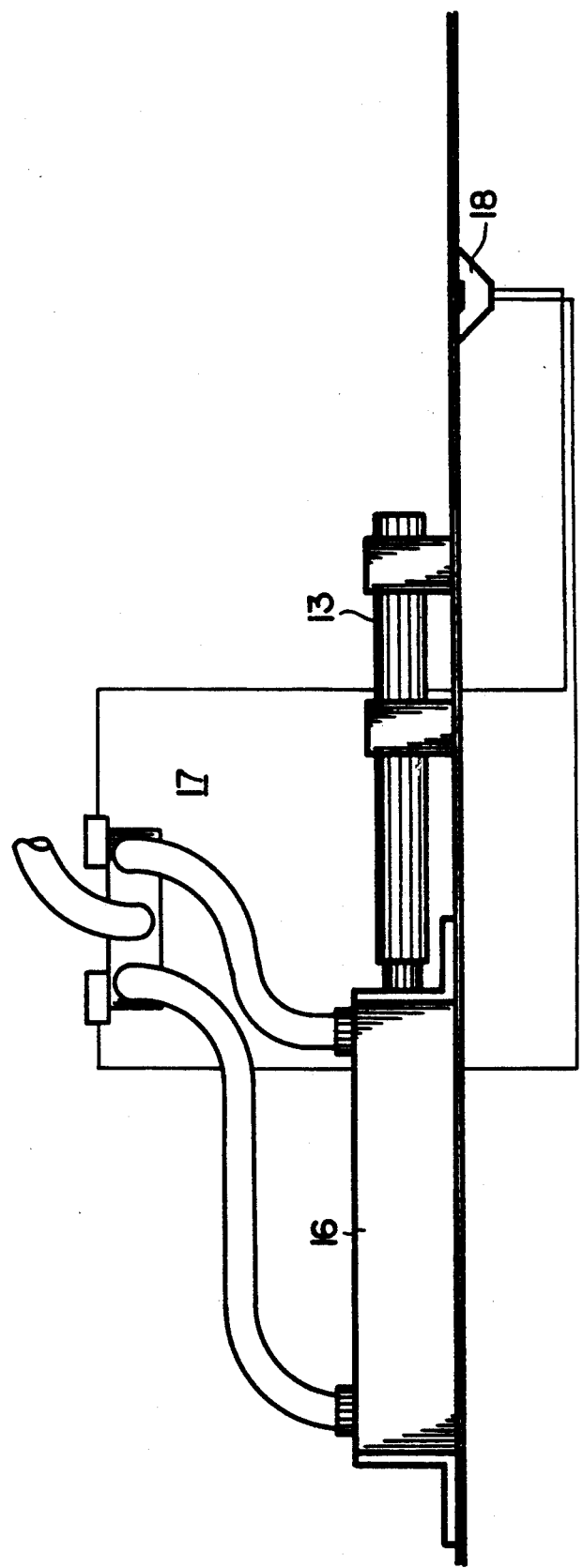
FIG. 2 is detail schematic view of my ram-press

Ram-press 13 may be hydraulic or pneumatic as depicted schematically in FIG. 2. There, ram-press 13 is operated by cylinder 16 and controlled by solenoid 17 and switch 18. However, ram-press 13 may also be mechanized, for example, operated by a wheel or cam and connecting rod. All that is required is a quick, strong reciprocating action to permit loading of the receiver 11 and then pressing of the individual billet 10 against cutter 12.

After the sticks are cut, they are sorted to remove sticks with rinds, which may be advantageously used as skewers for shish-ka-bob. Also, short sticks and splinters, which may be advantageously pressed to remove juices for canning, are removed. The sorted cut sticks are then cleaned and packaged, either raw in air-tight pouches or cans, or dried in bags.

What I claim is:

1. A shaped sugar cane product made by the method of:
  a. billeting sugar cane stalks into lengths of from about 1½ inches to about 20 inches;
  b. loading a tube with an opening on its one side and end with an individual billet; and
  c. cutting the individual billet into sticks by pressing the billet lengthwise in the tube against a cutter comprising a grid of intersecting cutting blades with a reciprocating action for each individual billet.

2. The sugar cane product of claim 1 wherein the reciprocating action is provided by a hydraulic ram-press.

3. The sugar cane product of claim 1 wherein the reciprocating action is provided by a wheel and connecting rod.

4. The sugar cane product of claim 1 wherein the reciprocating action is provided by a cam and connecting rod.

* * * * *